US010212921B1

(12) United States Patent
Plemmons

(10) Patent No.: US 10,212,921 B1
(45) Date of Patent: Feb. 26, 2019

(54) BIRD FEEDER WITH IMAGE CAPTURING

(71) Applicant: David H Plemmons, Bellemont, AZ (US)

(72) Inventor: David H Plemmons, Bellemont, AZ (US)

(*) Notice: Subject to any disclaimer, the term of this patent is extended or adjusted under 35 U.S.C. 154(b) by 0 days.

(21) Appl. No.: 15/405,472

(22) Filed: Jan. 13, 2017

Related U.S. Application Data

(60) Provisional application No. 62/286,003, filed on Jan. 22, 2016.

(51) Int. Cl.
*A01K 29/00* (2006.01)
*A01K 39/01* (2006.01)
*A01M 31/00* (2006.01)
*H04N 7/18* (2006.01)

(52) U.S. Cl.
CPC ........ *A01K 29/005* (2013.01); *A01K 39/0113* (2013.01); *A01M 31/002* (2013.01); *H04N 7/183* (2013.01); *H04N 7/188* (2013.01)

(58) Field of Classification Search
CPC .. A01K 29/005; A01K 39/0113; A01K 39/01; A01K 39/012; A01K 39/0125; A01K 39/04; A01K 39/014; A01M 31/002
See application file for complete search history.

(56) References Cited

U.S. PATENT DOCUMENTS

| | | |
|---|---|---|
| 2,230,058 A | 1/1941 | Hornung |
| 3,083,687 A | 4/1963 | Slaven |
| 3,211,130 A | 10/1965 | Prince |
| 3,295,498 A | 1/1967 | Brown |
| 3,977,363 A | 8/1976 | Fisher, Jr. |
| 5,025,753 A | 6/1991 | Schneider |
| 5,052,342 A | 10/1991 | Schneider |
| 5,205,239 A * | 4/1993 | Stolwein ............ A01K 39/0113 119/52.3 |
| 5,452,682 A | 9/1995 | Bescherer et al. |
| 5,904,330 A | 5/1999 | Blazey et al. |
| 6,155,205 A | 12/2000 | Coates |
| 6,803,945 B1 | 10/2004 | Needham et al. |
| 6,830,009 B1 | 12/2004 | Kuelbs et al. |
| 7,066,662 B2 | 6/2006 | Cuddeback et al. |
| 7,534,056 B2 | 5/2009 | Cross et al. |
| 7,735,453 B2 | 6/2010 | Vosbikian |

(Continued)

FOREIGN PATENT DOCUMENTS

GB 2508151 A1 5/2014

*Primary Examiner* — Trinh T Nguyen
(74) *Attorney, Agent, or Firm* — Invention To Patent Services; Alex Hobson

(57) ABSTRACT

A bird feeder has a perch that is configured to enable a bird of a particular size to perch thereon and feed from the bottom of an enclosure. The offset distance between the perch and the bottom of the feeder enables birds of only a particular size to effectively pull seed from the access ports in the bottom of the enclosure. A camera is located to take images, still or moving, of birds as the feed from the feeder and theses images may be wirelessly transmitted to a remote electronic device, such as a cell phone. A motion detector may detect when a bird lands on the perch and the control system may then initiate the capture of images by the camera. The offset distance between the perch and the bottom of the feeder may be adjusted to enable birds of a desired size to feed from the feeder.

18 Claims, 9 Drawing Sheets

(56) References Cited

U.S. PATENT DOCUMENTS

2005/0212912 A1  9/2005  Huster
2006/0070110 A1  3/2006  Mercer
2008/0134979 A1  6/2008  Crocker

* cited by examiner

BIRD FEEDER WITH IMAGE CAPTURING

CROSS REFERENCE TO RELATED APPLICATIONS

This application claims the benefit of U.S. provisional patent application No. 62/286,003, filed on Jan. 22, 2016; the entirety of which is hereby incorporated by reference herein.

BACKGROUND OF THE INVENTION

Field of the Invention

The invention is directed to bird feeders having for particular construction to allow birds of a particular size to perch thereon and feed, and to reliable capture images of said perching birds.

Background

Many people enjoy watching birds in their backyard bird feeders. In addition, scientist observe and count the number of birds visiting bird feeders to better understand the number and types of birds in a given area. Birds of a particular type can be drawn to a feeder through the selection of a particular type of feed, as well as the construction of the feed openings. A particular bird variety may be drawn to a feeder by a specific type of feed. In addition, some birds are equipped to retrieve feed through certain size openings while others are excluded. Therefore, a bird feeder with a particular feed opening may attract certain species of birds and prevent others from feeding. These feeders however, do not enable a person to adjust the type feed opening to change the species of birds that are capable of feeding therefrom. Some bird enthusiast may want to change the type of birds they entice from time to time. Therefore, they are required to put out different types of bird feeders and/or different types of feed for this purpose.

Currently there exist a number of solutions for offering feed to birds in an attempt to allow an observer to enjoy watching this activity. One design dispenses seed food from holes arrayed on the surface of a tube while another places an opening at the bottom of a seed reservoir where gravity draws it out directly onto a feeding platform. These options fail to allow full viewing of all the various feeding locations on the feeder as the bird or birds may select to perch at a point obscured behind the feeders themselves. Even in the case where the feeding bird is visible the view may suffer from the background distraction of the feeder itself. Yet another attempted solution eliminates the use of a seed reservoir entirely. This "platform feeder" design fails to provide protection of the seed food from precipitation that could cause spoilage.

There exists a need for a wild bird feeder that substantially improves the visibility of birds as they feed while at the same time protects the feed as well as birds perched on the feeder. In addition, there exists a need for a bird feeder that can allow birds of a particular size to perch and feed while excluding others that are either two large or two small. There exists a need for a means to reliable capture images of birds while they feed for enjoyment from a remote location, for example.

SUMMARY OF THE INVENTION

The invention is directed invention is directed to bird feeders having for particular construction to allow birds of a particular size to perch thereon and feed, and to reliable capture images of said perching birds. The bird feeder of the present invention comprises an enclosure for receiving bird feed and access ports along the bottom of the enclosure to dispense feed. A perch is configured directly under the enclosure at an offset distance from the enclosure, thereby allowing birds of a particular sized to perch and reach the access ports. In an exemplary embodiment, the offset height, or distance from the top of the perch to the bottom of the enclosure or to the access ports is adjustable, thereby allowing a person to change the type of bird, based on size exclusion, that can feed from the bird feeder. The offset height may be measured along a vertical axis extending through the enclosure. In still another embodiment, a bird feeder comprises a camera that is located on an arm extension that couples the perch to the enclosure. The arm extension may be adjustably attached to the enclosure and/or the perch may be adjustably attached to the arm extension to allow changes in the offset height. An exemplary arm extension extends from the perch to the side of the bird feeder enclosure, whereby a camera configured thereon can capture images of birds on the perch. It is desirable that the camera be configured in a location to allow image capture of birds on the perch. An arm extension extending directly up from the perch to the feeder would not allow reliable capturing of images of birds on the perch, as it would only be able to capture a portion of the perch.

An exemplary bird feeder enclosure has an interior volume for receiving feed and a refill opening for easily refilling the enclosure as the feed is depleted. An opening cover may seal the refill opening from the elements. An exemplary enclosure in tapered in dimension from the top to the bottom, wherein the access ports are configured. In this way, the feed is gravity fed to the access ports. For example, the enclosure may have two side walls that are offset by a larger width at the top of the enclosure than at the bottom of the enclosure and the end walls may have a triangular shape. The top of the enclosure may extend over the side and end wall top edges to provide additional protection of the perch and/or feeding platform from the elements. One or more of the side and/or end walls may be transparent or translucent enable viewing of the feed level through the enclosure. The enclosure may have a length that is more than about 10 cm, more than about 15 cm, more than about 20 cm, more than about 30 cm, more than about 40 cm, or about 40 cm or less, about 30 cm or less, about 25 cm or less and any range between and including the length values provided. The width of the enclosure taken along the top edges of the side walls may be about 5 cm or more, about 7 cm or more, about 10 cm or more, about 15 cm or more, about 20 cm or more, or about 20 cm or less, about 15 cm or less and any range between and including the width values provided.

The enclosure may comprise one or more access ports configured along the bottom of the enclosure. The access ports may have a length and width suitable for a certain type of bird to feed therefrom, or for a particular type of feed. An access port may have a length that is greater than a width such as about one and a half times the width or more, about two times the width or more, about five times the width or more, about 10 times the width or more and any range between and including the aspect ratios of the length to width provided. The access ports may be configured with the access port length in parallel or perpendicular with the length of the enclosure. The length of the access ports may be parallel with the length of the enclosure and may extend directly along the bottom of the enclosure. When the lengths of the access ports are perpendicular to the length of the enclosure, the access ports may extend across the bottom of the enclosure. An enclosure may comprise any number of access ports, including, one, two, three, four, five or more, ten or more and the like. An access port may be defined by an access port insert that is inserted into the enclosure and is held in place by the tapering geometry of the enclosure. A variety of access port inserts having different types of opening sizes and shapes may be provided with the bird feeder to allow a user to change out the access port inert for a particular type of feed and/or for attracting a particular type or types of birds. The access ports may be configured for a certain type of feed, wherein the feed will not fall to easily through the access port. Likewise, an access port may have dimensions that enable certain types of birds to use their beaks to pull feed from the access ports. The access ports may be rectangular in shape, oval, irregularly shaped and the like.

An exemplary bird feeder comprises a perch that is configured under the access ports, thereby allowing a bird to perch and retrieve feed from the access ports above. The offset height of the perch to the access ports will control what type of bid can fit between the perch and the access ports to feed. A bird that is too large will not be able to fit within a small offset height and a bird that is too small will not be able to reach the access ports with their beak when resting on the perch. This size exclusion feature is therefore for attracting birds of a particular size, wherein larger and smaller birds will not be accommodated. A perch may have a length that is equal to or less than the length of the enclosure, thereby preventing larger birds from landing on the perch. The perch length may be a fraction of the length of the enclosure, such as about 90% or less the length of the enclosure, about 75% or less the length of the enclosure, about 60% or less the length of the enclosure, about 50% or less the length of the enclosure, about 25% or less the length of the enclosure. When a short perch is configured on the bird feeder, the access ports may extend a similar length along the bottom of the enclosure as the length of the perch. The perch may be adjustably connected to the arm extension by a perch attachment feature, wherein the fixed location of the perch along the length of the arm extension may be changed. For example, the arm extension may have a plurality of holes or indents for securing the perch in these locations. In another example, the perch comprises a set screw that creates an interference fit with the arm extension to secure the perch to the arm extension. In another embodiment, the arm extension is adjustably connected to the enclosure by an extension attachment feature.

An exemplary perch may be rod shaped thereby requiring birds to feed directly from the access ports, as the feed will not collect on the perch. A perch may be a "perch only shape" perch, wherein feed will not collect on the perch, wherein the perch has a rounded top surface that will cause feed to slid off due to gravity. A "perch only shape" perch may be a rod or cylinder or have a rounded top surface that may be smooth to prevent collection of feed that drops from the access ports. In another embodiment, a perch may comprise a flat top surface that allows feed to collect on the perch as it falls from the access ports. Furthermore, a perch may comprise ribs or slots to allow feed to be retained on the perch for birds to feed therefrom. A perch may be configured directly under the access port, or bottom of the enclosure.

In an exemplary embodiment, the bird feeder comprises a camera for capturing images, still or moving, of birds perched on the bird feeder. The camera may be a still image capture camera that captures still images, or a video camera that captures moving images, or videos of birds feeding while on the perch. The camera may include a microphone, or a separate microphone may capture sounds, such as in a video recording of a bird on the bird feeder. A preferred location of the camera is along the arm extension where it will reliable capture images of birds perched between the perch and the bottom of the enclosure. With the camera located on the arm extension, the camera location may change when the arm extension is adjusted with respect to the enclosure by the extension attachment feature. A motion detector may activate the camera to take a picture or video when a bird lands on the perch, or at some delayed time from the motion detection. For example, a camera may be activated one or more, two or more, three or more seconds after motion is detected by the motion detector. A control system with a control circuit and/or microprocessor may control the activation of the camera after receiving a signal from the motion detector. The images, still or moving, may be transmitted by a wire to an electronic device. For example, a wire may extend from the feeder to an electronic display located in someone's home. In another embodiment, the images, still of moving, are transmitted by a wireless signal transmitter to a remote electronic device, such a mobile phone, computer, tablet computer, database, photo-frame and the like. In an exemplary embodiment, a remote electronic device is configured to receive images captured by the camera on the bird feeder through a short-range communication device, Bluetooth, for example. For example, a user may have a photo-frame mounting in their kitchen and when a bird lands on the perch of the bird feeder and an image is captured by the camera, as described herein, the photo-frame may display the captured image. The bird feeder may also comprise some data storage capability, such a portable storage device, i.e. thumb drive, to store images captured by the camera. A user may periodically remove the portable storage device and couple it with a remote electronic device to download the captured images.

An exemplary bird feeder as described herein, may be used to feed birds of a particular size. The feed may be selected for a particular type of bird or species of bird, and the access port insert may be selected for that type of feed and the type of bird desired. Bird feed includes seeds, nuts, and the like. The access port insert may be inserted into the enclosure and the feed may be inserted into the enclosure. The offset height of the perch to the access ports may be adjusted and set for the desired species of bird. The desired species of bird will be attracted to the bird feeder whereas larger and smaller birds will not be able to utilize the bird feeder. In addition, an exemplary bird feeder as described herein, may be used to capture images of birds while feeding on the bird feeder and can be used to capture images of birds of a particular size.

An exemplary bird feeder as described herein, may comprise a light that provides additional lighting to the perch for example and may aid in better quality image capture of the bird or birds perched and feeding on the feeder.

An exemplary bird feeder as described herein, may comprise a speaker that can be used to emit bird calls to attract birds of a particular species or type to the bird feeder.

Any of the electronic devices of the bird feeder may be powered by power cable, wherein a cable extends from the bird feeder to an outlet for example. In a more preferred embodiment, the electronic devices are powered by a battery, such as a consumable battery or a rechargeable battery. A battery may be charged by a solar power system configured on the bird feeder. For example, a solar cell, comprising a photovoltaic device may be configured on the bird feeder and may charge a battery that then provides power to the electronic devices. The electronic devices include, but are not limited to, the camera, speaker, light, microphone, controller, motion detector, wireless signal transmitter, portable data storage device and the like.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
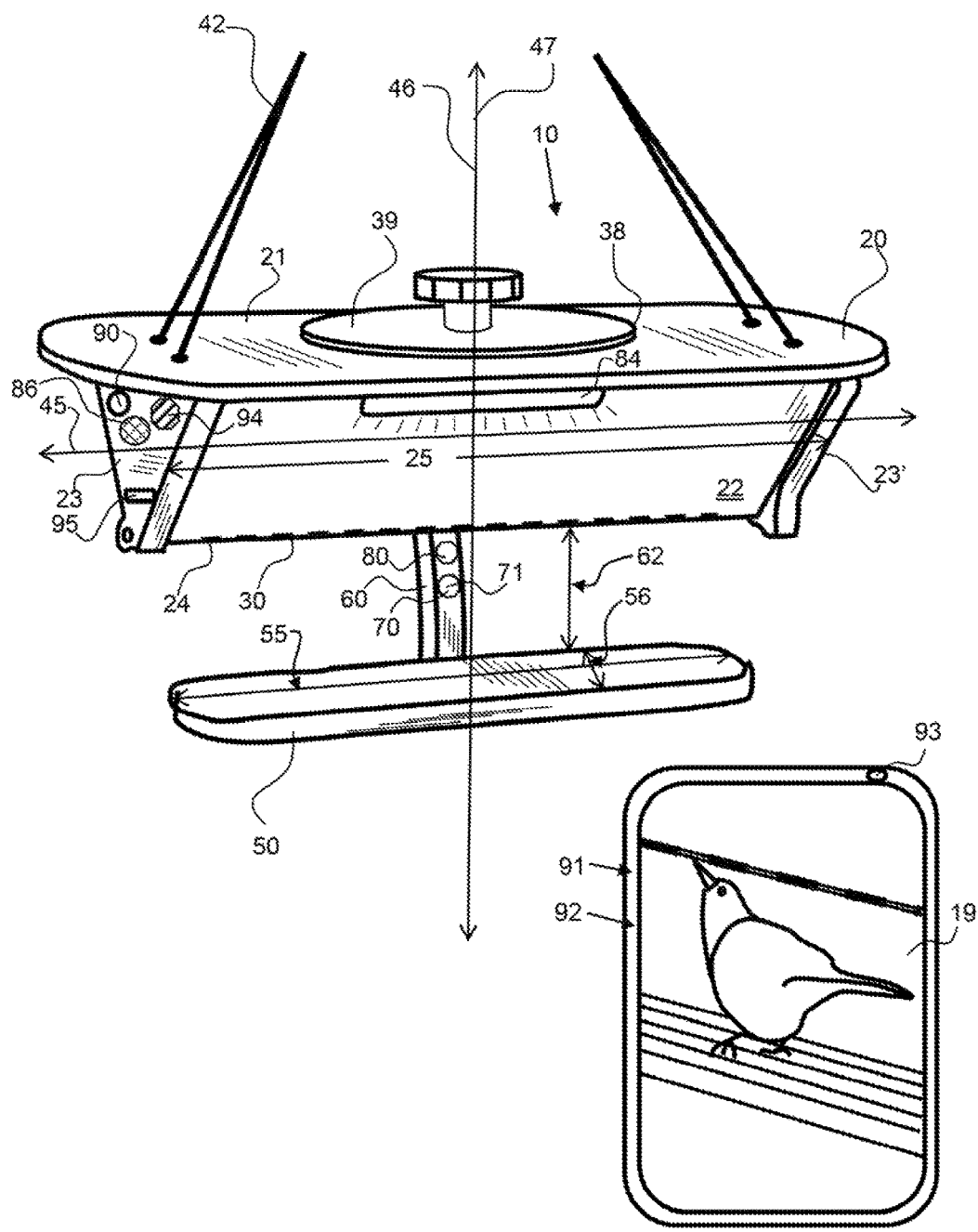
FIG. 1 shows a perspective view of an exemplary bird feeder of the present invention.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

In cases where the present specification and a document incorporated by reference include conflicting and/or inconsistent disclosure, the present specification shall control.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications and improvements are within the scope of the present invention.

As shown in FIG. 1, an exemplary bird feeder 10 comprises an enclosure 20 for retaining bird feed and hangers 42 for suspending the bird feeder off the ground. The enclosure has a top 21 having a refill opening 38 and opening cover 39. The opening cover can be removed to enable replenishment of the bird feed within the enclosure. The enclosure has side walls 22 that are tapered in width from the top to the bottom 24. The ends 23, 23' of the enclosure are triangular in shape. At the bottom of the enclosure there are access ports 30, or openings to enable the bird feed to be dispensed there through. The enclosure has a length 25 that extends along the length axis 45. The perch 50 extends under the enclosure and has a length 55 that is substantially parallel with the length axis of the enclosure, or parallel with the bottom of the enclosure where the access ports are configured. The perch extends under the enclosure at an offset height 62, such as a vertical distance from the bottom of the enclosure or access ports to the top of the perch. The arm extension 60 couples the perch to the enclosure and extends from the perch, or from the side of the perch, to the side of the enclosure. In this way, the arm extension is offset from the centerline 46 extending through the access ports and up through the top of the enclosure. This offset distance of the camber from the centerline allows reliable capture of bird images by the camera 70 on the arm extension. In an exemplary embodiment, the offset height may be adjusted to accommodate birds of different sizes. A bird may land on the perch and feed directly from the access ports 30 or form feed that has landed on the perch. The perch in this embodiment has a width 56 that extends across the top of the perch. In an exemplary embodiment, the width of the perch may be small to require the birds to retrieve the feed from the access ports. The width may be no more than about 25 mm, no more than about 20 mm, no more than about 15 mm, no more than about 10 mm and any range between and including the perch widths provided. In this embodiment, the top of the perch extends perpendicular to the vertical axis 47 of the bird feeder. The vertical axis 47 extends through the access ports and up through the top of the bird feeder. The perch is configured directly under the access ports with the center of the perch being configured substantially in line with the vertical axis 47, wherein it may be offset from the vertical axis by no more than about 25 mm, an preferably no more than about 15 mm, and even more preferably no more than 10 mm.

The exemplary bird feeder shown in FIG. 1 comprises a camera 70, microphone 71 and motion detector 80 configured on the arm extension 60. The motion detector will activate the camera to capture an image, still or moving, when bird lands on the perch. The exemplary bird feeder has a control system including a microprocessor 94 that controls the functions of the bird feeder. Images captured by the camera may be transferred wirelessly to a remote electronic device 92, such as a mobile phone 91. The remote electronic device has a receiver 93 for receiving wireless signals from the wireless signal transmitter 90 of the bird feeder. An image 19 of a bird that had landed on the bird feeder is being displayed on the mobile phone. Also shown in FIG. 1, is a light 84 that is configured to provide illumination to the perch area of the bird feeder. The additional light may enable better image capture by the camera. The light may be located in an area of the bird feeder where it is protected from the elements, such as under the top 21 of the bird feeder, or within the enclosure 20. The bird feeder also comprises a speaker 86 configured to transmit sound from the bird feeder, such as bird calls to attract birds, and more preferably birds of a particular type, to bird feeder.

Figure 2:
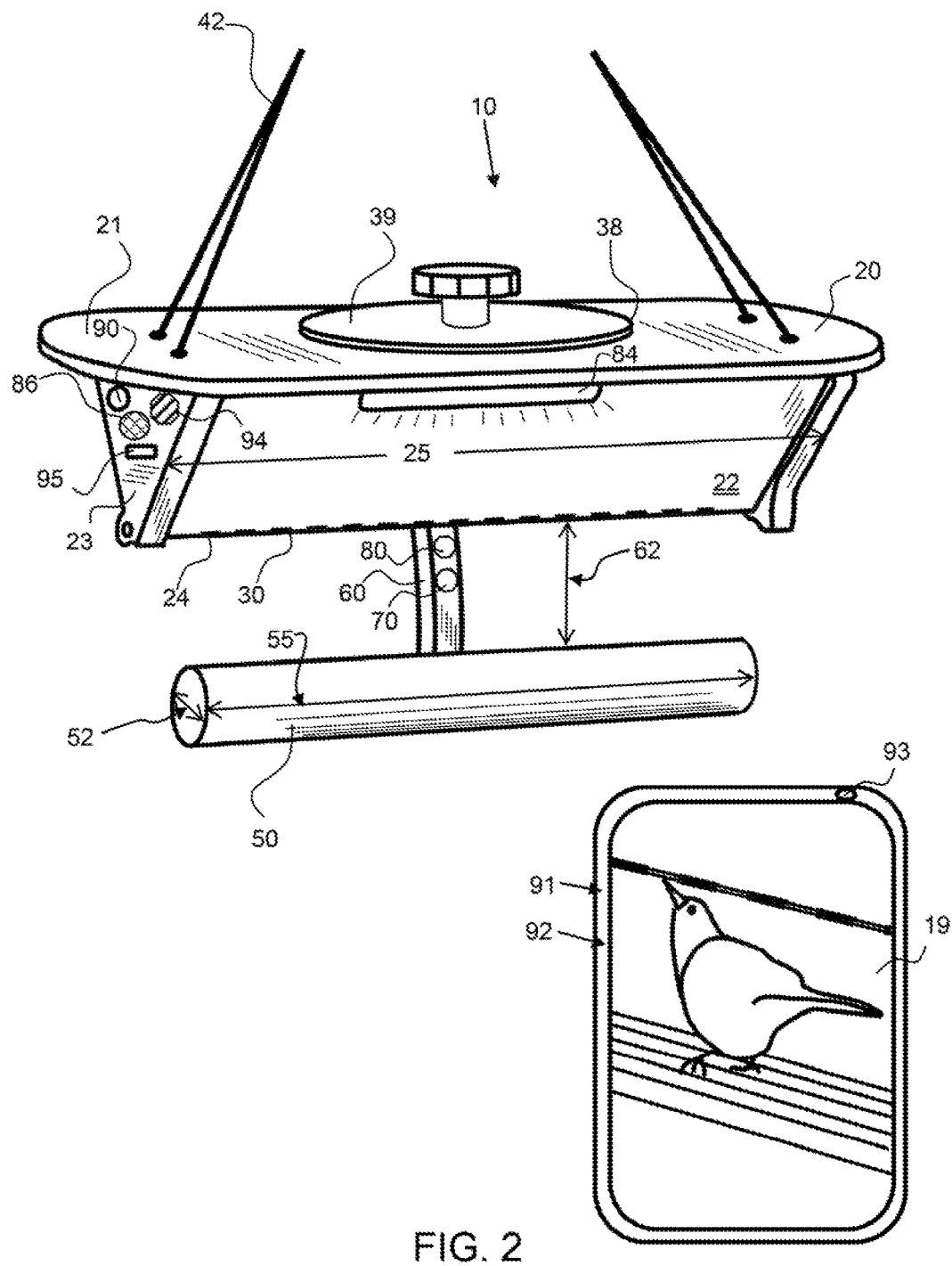
FIG. 2 shows a perspective view of an exemplary bird feeder of the present invention.

As shown in FIG. 2, an exemplary bird feeder 10 has a perch 50 that is cylindrical in shape having a length 55 and diameter 52. The diameter, or width, of the perch may be no more than about 25 mm, no more than about 20 mm, no more than about 15 mm, no more than about 10 mm and any range between and including the perch widths provided. Also, a rounded perch will prevent feed from collecting on the perch and therefore require the birds to retrieve the feed from the access ports, wherein the camera can get a good picture of them. In this embodiment, bird feed would not collect on the perch as it would slide off the rounded top surface of the perch and fall to ground. The length of the perch 50 is slightly less than the length 25 of the enclosure. The motion detector 80 and camera 70 are both configured on the arm extension. The motion detector may be configured in another location where it would detect that a bird has landed on the perch. The control system, including the microprocessor 94 and wireless signal transmitter 90 are configured on the enclosure, along with the portable data storage device 95.

Figure 3:
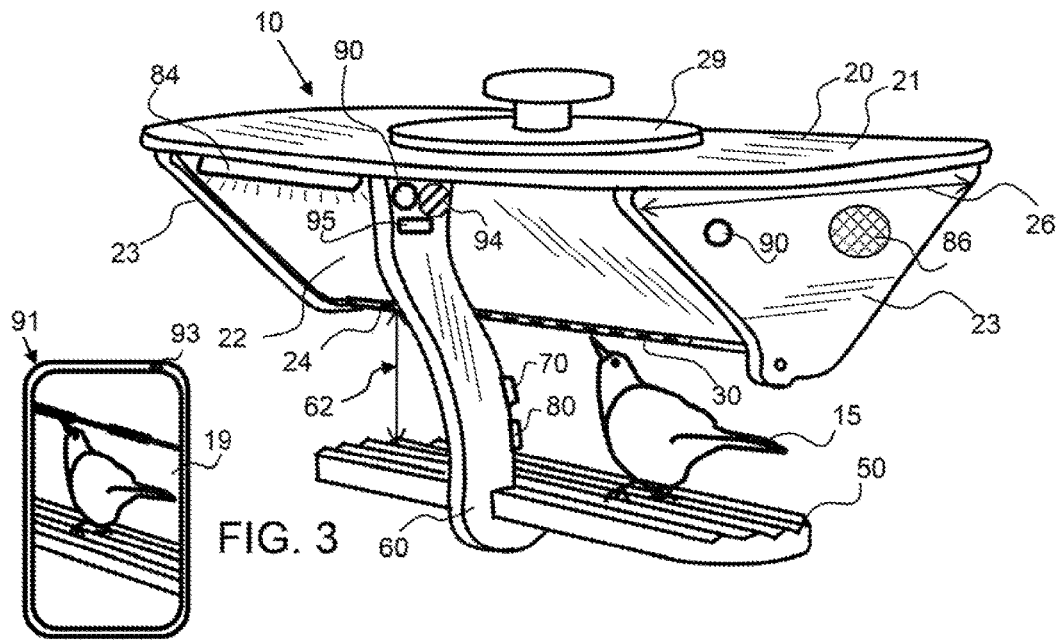
FIG. 3 shows a perspective view of an exemplary bird feeder having a bird feeding while perched on the perch below the access ports.

As shown in FIG. 3, an exemplary bird feeder 10 has a small bird 15, such as a finch, feeding while perched on the perch 50 below the access ports 30. The bird can reach the access ports with its beak, as the offset height 62 is set to accommodate birds of this size. The width 26 of the enclosure proximal the top 21 of the enclosure is shown. The enclosure tapers in width from the top down to the bottom to cause the feed to flow by gravity to the access ports.

Figure 4:
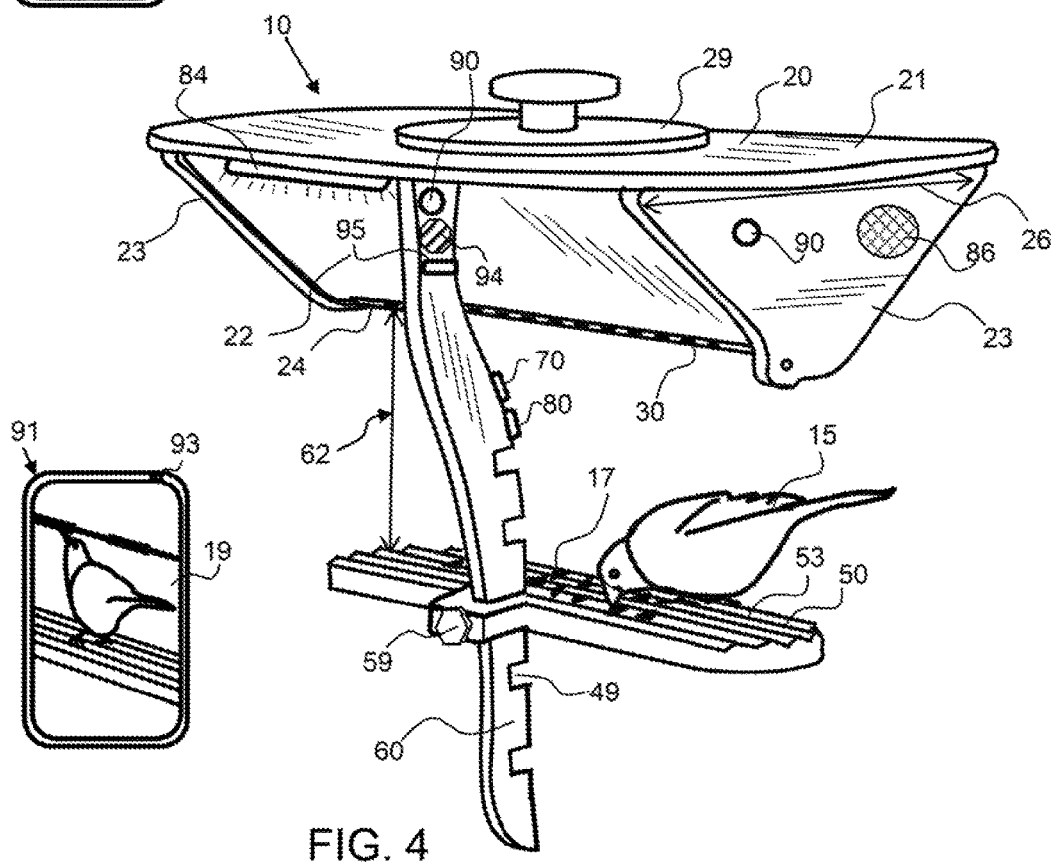
FIG. 4 shows a perspective view of an exemplary bird feeder having a bird feeding on feed that has dropped onto the feeding platform.

As shown in FIG. 4, an exemplary bird feeder has a bird 15 feeding on feed 17 that has dropped onto the platform 53 portion of the perch 50. The feeding platform has ribs running along the length of the perch to retain feed as it drops down onto the platform. The platform extends horizontally, thereby retaining feed that has dropped thereon. The arm extension has a plurality of set notches 49 to allow the perch to be secured at different offset heights 62 from the bottom 24 of the enclosure 20. A perch attachment feature 59 allows the perch to be secured in any of the notches configured along the length of the arm extension. A set screw is configured to pull the perch tight to the arm extension to secure it in place. It is to be understood that the perch may be configured to be set at any location along the length of the arm extension by way of a set screw or other securing feature. The bird 15 feeding on the perch is too small to reach the access ports 30 at the bottom 24 of the enclosure 20. Therefore, when the feed on the perch is consumed the bird will no longer be able to access feed within the enclosure.

Figure 5:
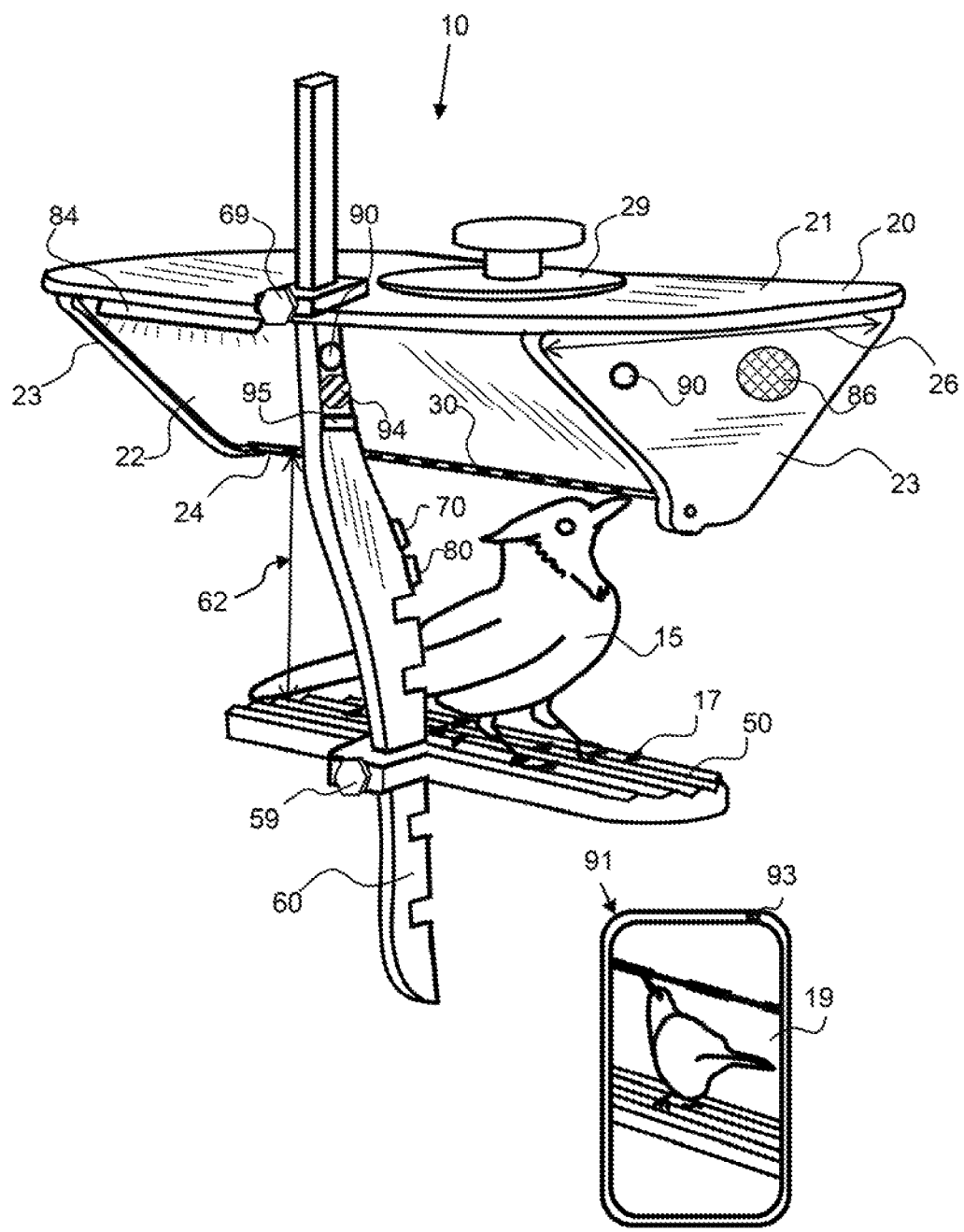
FIG. 5 shows a perspective view of an exemplary bird feeder having a larger bird feeding from the access ports.

As shown in FIG. 5, an exemplary bird feeder has a larger bird 15 feeding from the access ports 30 of the enclosure 20. The offset height 62 is configured for a bird of this size. Smaller birds, such as the bird shown in FIG. 4, would not be able to reach the access ports 30. The arm extension 60 is adjustably attached to the enclosure by an extension attachment feature 69. The extension attachment feature allows the arm extension to slide up and down and be secured in position. The adjustment of the location of securing the arm extension adjusts the offset height.

Figure 6:
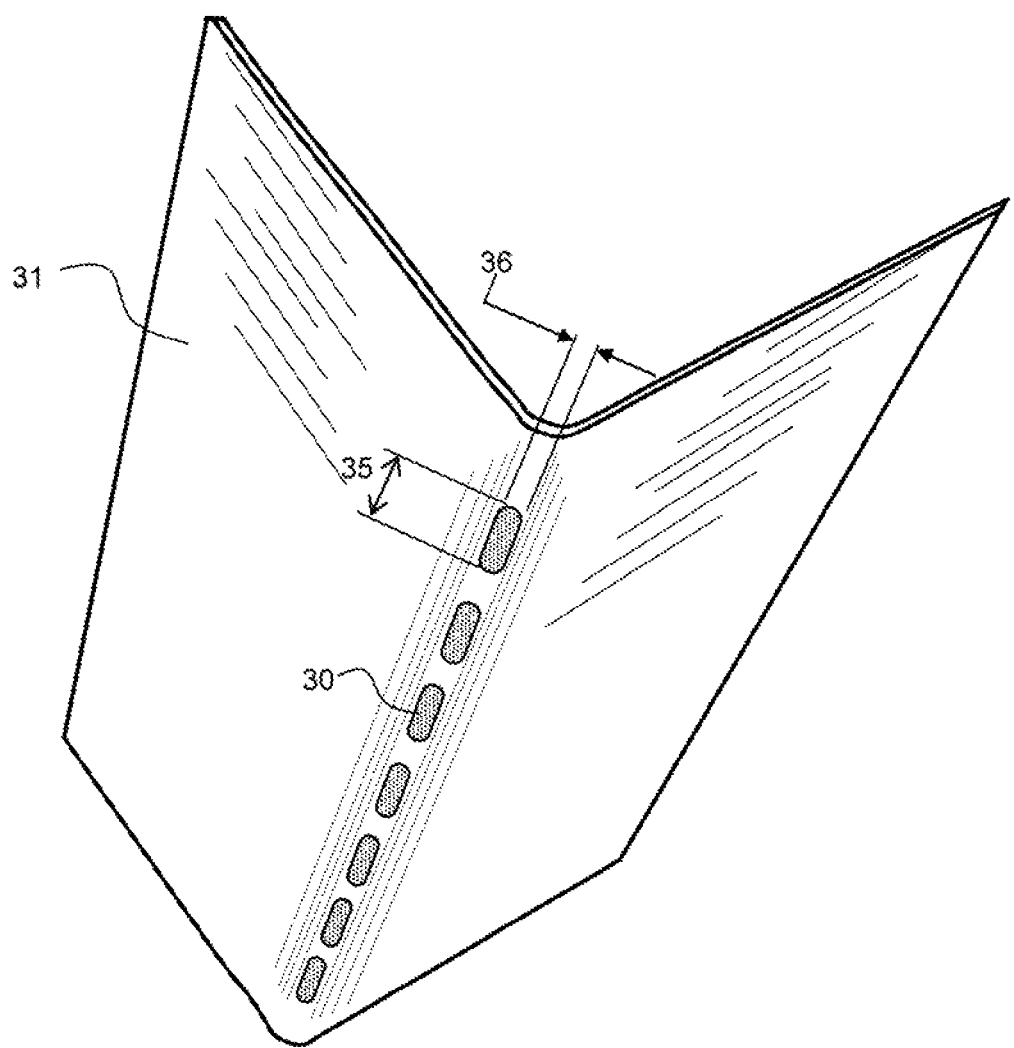
FIGS. 6, 7, 8, and 9 show exemplary access ports geometries.
Figure 7:
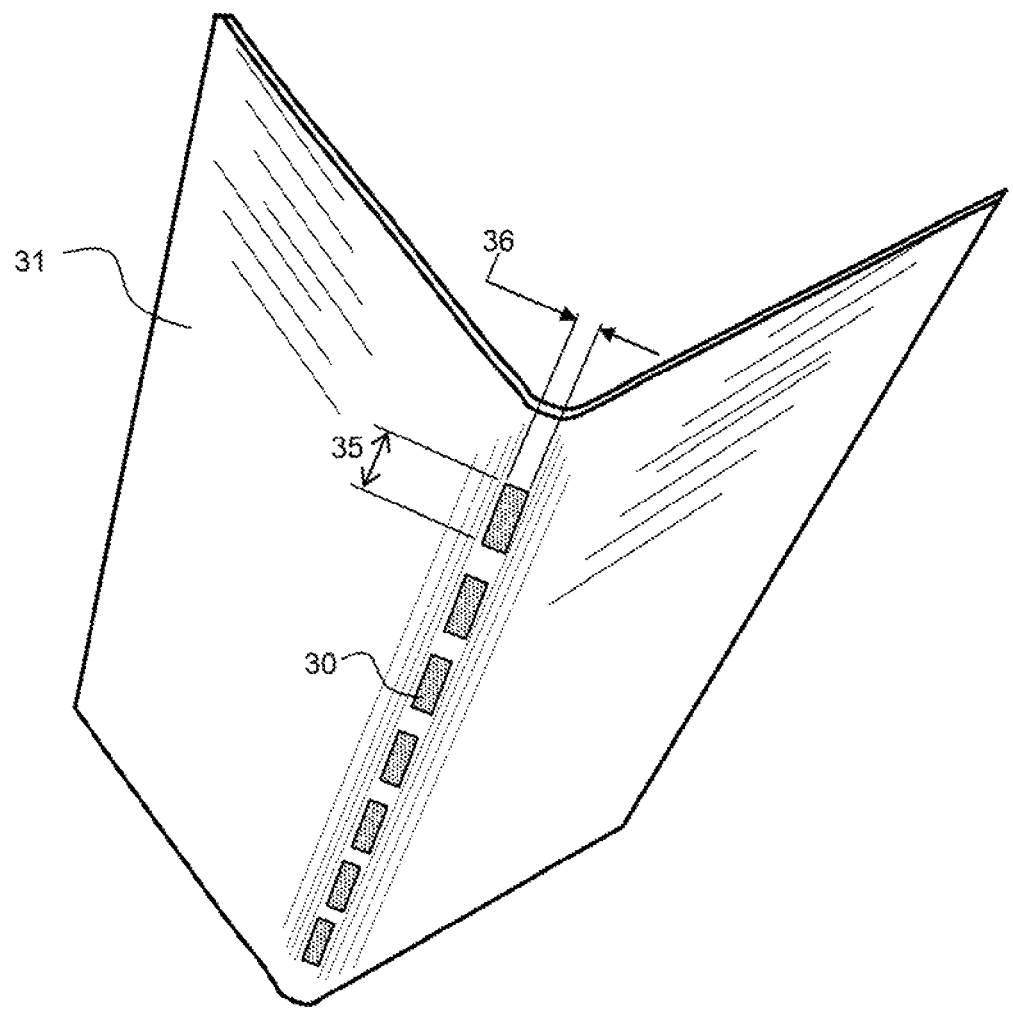
Figure 8:
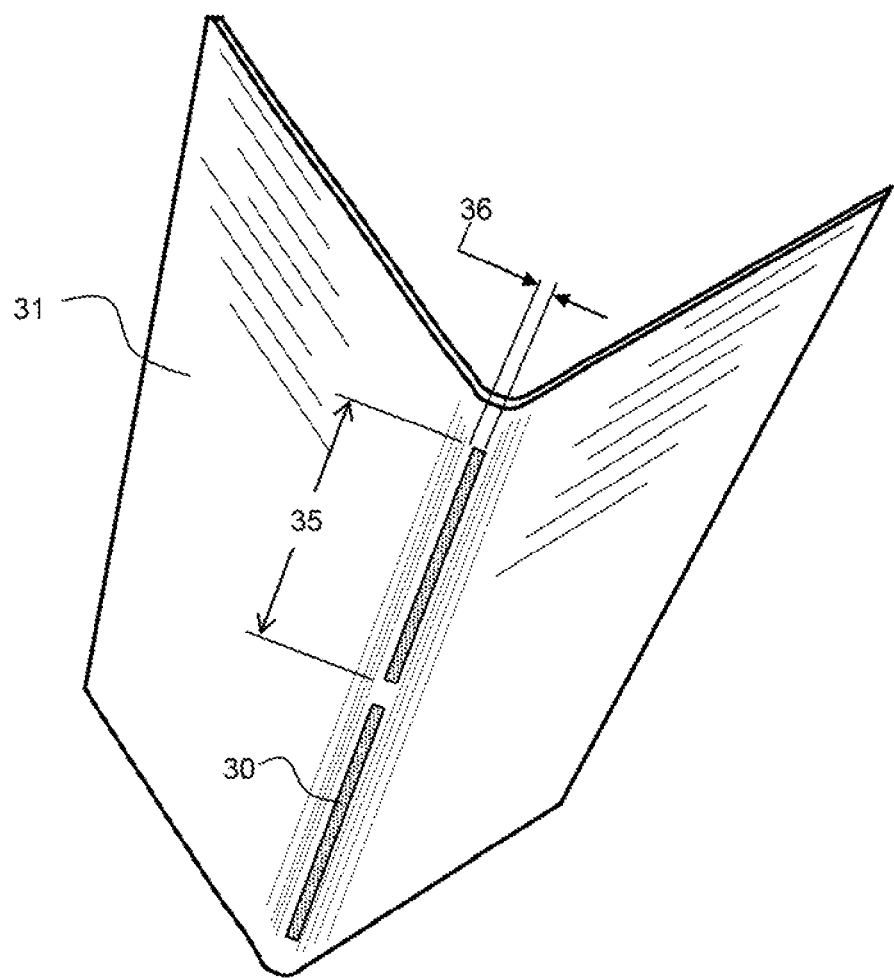
Figure 9:
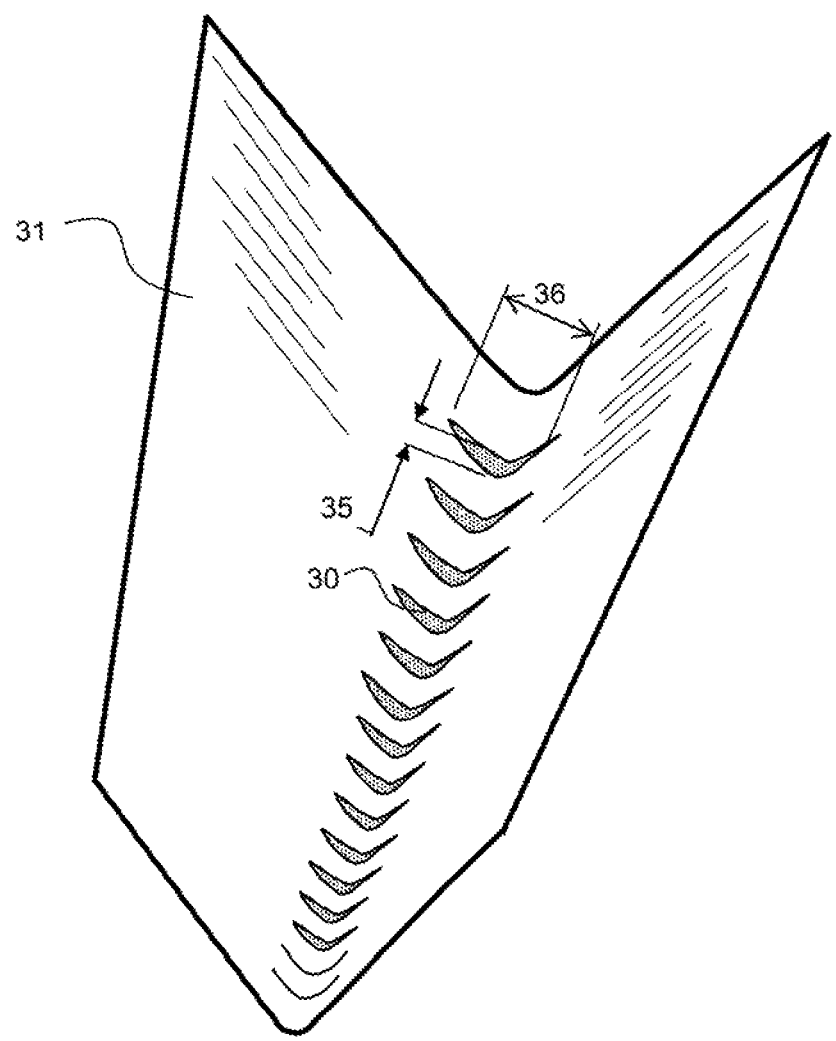

FIGS. 6 to 9 show exemplary access port 30 geometries. The length 35 and width 36 of the access port openings is shown in each figured. The access port insert may be configured within the enclosure, or may be affixed to the top and ends of the enclosure to form the enclosure. FIG. 6 shows seven access ports configured along the bottom of the access port insert 31. The access ports shown in FIG. 6 are oblong shaped with rounded corners. FIG. 7 shows seven access ports 30 that are rectangular in shape. FIG. 8 shows two access ports that are rectangular in shape, wherein the length 35 is more than five times greater than the width 36. FIG. 9 shows a plurality of access ports that are slits extending across the length direction of the bottom of the enclosure, when configured in the enclosure. The width 36 is greater than the length 35.

Figure 10:
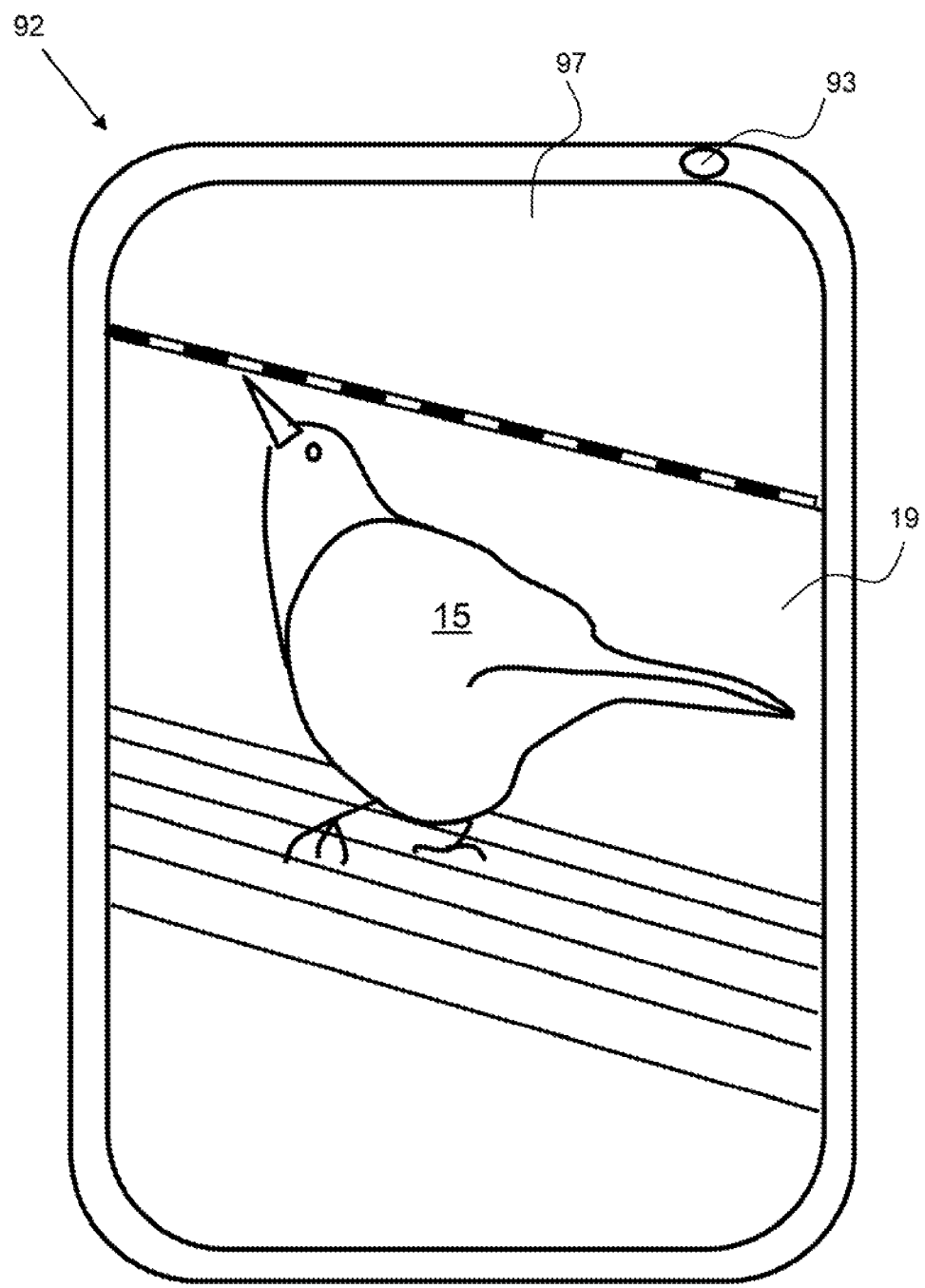
FIG. 10 shows a remote electronic device, a tablet computer, with an image being displayed of a bird feeding from the bird feeder of the present invention.

As shown in FIG. 10, a remote electronic device 92, such as a tablet computer 97, is displaying an image 19 of a bird 15 feeding from the bird feeder of the present invention.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A bird feeder comprising:
   a) an enclosure for receiving bird feed comprising:
      i) an opening for receiving bird feed;
      ii) access ports configured along a bottom of said enclosure;
   b) a perch coupled to the enclosure by an arm extension;
      wherein the perch is configured under the access ports of the enclosure by an offset height;
      wherein the perch is configured for a bird, having a suitable size to fit within the offset height, to rest on the perch and feed from the access ports above the perch;
      wherein the perch is adjustable in offset height;
      whereby the offset height can be adjusted to accommodate a bird of a suitable size to fit within the offset height and feed from the access ports while resting on the perch; and
      wherein the perch is adjustably coupled to the arm extension by a perch attachment feature and wherein the perch can be adjusted in offset height along the arm extension.

2. The bird feeder of claim 1, wherein the enclosure has a tapered width along a vertical axis down to the bottom of the enclosure.

3. The bird feeder of claim 2, wherein the access ports have a length and a width and are configured along at least a portion of a length of the bottom of the enclosure.

4. The bird feeder of claim 3, wherein the length of the access ports is more than twice the width of the access ports.

5. The bird feeder of claim 3, wherein the length of the access ports extends along the length of the bottom of the enclosure.

6. The bird feeder of claim 1, wherein the length of the access ports extends substantially perpendicularly to the length of the bottom of the enclosure.

7. The bird feeder of claim 1, wherein the perch extends substantially parallel with a length axis of the enclosure.

8. The bird feeder of claim 7, wherein perch is rod shaped.

9. The bird feeder of claim 7, wherein perch has planar top surface.

10. The bird feeder of claim 7, wherein the width of the perch is no more than 25 mm.

11. The bird feeder of claim 7, wherein the perch has a length that is less than a length of the enclosure.

12. The bird feeder of claim 1, wherein perch comprises a feeding platform, configured to catch bird feed that falls from the access ports, and wherein the perch extends substantially parallel with the bottom of the enclosure.

13. The bird feeder of claim 1, wherein the arm extension is adjustably coupled to the enclosure by an arm attachment feature and wherein the arm extension can be adjusted in position with respect to the enclosure to change the offset height of the perch.

14. A bird feeder comprising:
   a) an enclosure for receiving bird feed comprising:
      i) an opening for receiving bird feed;
      ii) access ports configured along a bottom of said enclosure;
   b) a perch coupled to the enclosure by an arm extension;
      wherein the perch is configured under the access ports of the enclosure by an offset height;
      wherein the perch is configured for a bird, having a suitable size to fit within the offset height, to rest on the perch and feed from the access ports above the perch;
   c) a camera positioned on the arm extension and configured to capture an image of a bird on the perch; and
   wherein the perch is adjustably coupled to the arm extension by a perch attachment feature, wherein the camera in maintained in a fixed position when the perch is adjusted in the offset height to accommodate a bird of a suitable size to fit within the offset height and feed from the access ports while resting on the perch.

15. The bird feeder of claim 14, further comprising a motion detector, wherein the camera is activated by the motion detector when the motion detector detects motion on the perch.

16. The bird feeder of claim 15, further comprising a wireless signal transmitter, wherein the image captured by camera is sent wirelessly to a remote electronic device.

17. The bird feeder of claim 14, wherein the camera is a video camera and configured to take a video image of a bird on the perch.

18. The bird feeder of claim 17, further comprising a wireless signal transmitter, wherein the video image captured by the camera is sent wirelessly to a remote electronic device.

* * * * *